United States Patent
Menocal et al.

(10) Patent No.: US 8,442,840 B2
(45) Date of Patent: May 14, 2013

(54) TRANSPARENT HEALTHCARE TRANSACTION MANAGEMENT SYSTEM

(76) Inventors: Tomas G. Menocal, Port Orange, FL (US); Kathleen A. Menocal, Port Orange, FL (US)

( * ) Notice: Subject to any disclaimer, the term of this patent is extended or adjusted under 35 U.S.C. 154(b) by 1663 days.

(21) Appl. No.: 11/353,658

(22) Filed: Feb. 14, 2006

(65) Prior Publication Data
US 2007/0192146 A1    Aug. 16, 2007

(51) Int. Cl.
*G06Q 50/00* (2012.01)
(52) U.S. Cl.
USPC .................................................. 705/2; 705/3
(58) Field of Classification Search ........... 705/2, 40, 705/4, 35, 3, 52
See application file for complete search history.

(56) References Cited

U.S. PATENT DOCUMENTS

| | | | |
|---|---|---|---|
| 5,070,452 A | 12/1991 | Doyle et al. | |
| 5,991,733 A * | 11/1999 | Aleia et al. | 705/7.13 |
| 6,076,066 A | 6/2000 | DiRienzo et al. | |
| 6,223,164 B1 | 4/2001 | Seare et al. | |
| 6,283,761 B1 | 9/2001 | Joao | |
| 6,343,310 B1 | 1/2002 | DiRienzo | |
| 6,732,113 B1 | 5/2004 | Ober et al. | |
| 6,785,680 B1 | 8/2004 | Cragun | |
| 6,827,670 B1 | 12/2004 | Stark et al. | |
| 7,346,523 B1 * | 3/2008 | Provost et al. | 705/4 |
| 7,567,938 B1 * | 7/2009 | Frederickson et al. | 705/39 |
| 7,904,305 B2 * | 3/2011 | Suringa | 705/2 |
| 7,962,350 B1 * | 6/2011 | Provost et al. | 705/4 |
| 7,970,629 B2 * | 6/2011 | Christen | 705/2 |
| 2001/0032099 A1 * | 10/2001 | Joao | 705/2 |
| 2001/0051880 A1 * | 12/2001 | Schurenberg et al. | 705/3 |
| 2002/0026328 A1 * | 2/2002 | Westerkamp et al. | 705/2 |
| 2003/0105648 A1 * | 6/2003 | Schurenberg et al. | 705/2 |
| 2003/0208445 A1 * | 11/2003 | Compiano | 705/40 |
| 2003/0229516 A1 * | 12/2003 | Nickerson | 705/2 |
| 2004/0128165 A1 * | 7/2004 | Block et al. | 705/2 |
| 2004/0172313 A1 * | 9/2004 | Stein et al. | 705/4 |
| 2004/0220865 A1 * | 11/2004 | Lozowski et al. | 705/35 |
| 2005/0010438 A1 * | 1/2005 | York et al. | 705/2 |
| 2005/0033604 A1 * | 2/2005 | Hogan | 705/2 |
| 2006/0036523 A1 * | 2/2006 | Stover et al. | 705/35 |
| 2006/0229909 A1 * | 10/2006 | Kaila et al. | 705/2 |
| 2007/0198404 A1 * | 8/2007 | Hirka et al. | 705/39 |
| 2007/0203757 A1 * | 8/2007 | Dibiasi et al. | 705/4 |

* cited by examiner

*Primary Examiner* — Gerald J. O'Connor
*Assistant Examiner* — Teresa Woods
(74) *Attorney, Agent, or Firm* — J. Wiley Horton

(57) ABSTRACT

A healthcare payment transaction system for managing and arranging payment for a healthcare service transaction provided by a healthcare service provider to a patient, particularly where the payment is to be paid by an insurer. The system includes an electronic deposit account for the healthcare service provider whereby the healthcare service provider records information regarding healthcare service transactions performed by the healthcare service provider for patients. It also features an electronic deposit account for the insurer whereby the insurer accesses information regarding healthcare service transactions for services provided for patients for which the insurer has payment responsibility. The insurer can also use its electronic deposit account to deposit payments for healthcare service transactions performed for patients covered by a policy issued by the insurer. A central system is used as a means for electronically transferring payments from the insurer's electronic deposit account to the healthcare service provider's electronic deposit account. A sweep function is further provided as a means for determining whether the healthcare service provider has recorded information regarding a healthcare service transaction for a patient for whom the insurer has payment responsibility.

12 Claims, 5 Drawing Sheets

TRANSPARENT HEALTHCARE TRANSACTION MANAGEMENT SYSTEM

BACKGROUND OF THE INVENTION

1. Field of the Invention

This invention relates to the field of healthcare transactions. More specifically, the present invention comprises a system and method for facilitating payment for a healthcare service transaction provided by a healthcare service provider to a patient, particularly where the payment is to be paid by an insurer.

2. Description of the Related Art

The rising administrative costs associated with providing healthcare services is a well-documented and growing problem for hospitals, physicians, patients, insurers and society in general. The United States currently spends in excess of 300 billion dollars per year for the administration of the healthcare system. Administrative costs continue to grow at a faster rate than the cost of the actual healthcare services. These administrative costs make healthcare more expensive for providers, patients, insurers, employers, and the government. In addition, these costs do very little to improve the quality of healthcare.

Although there are many inefficiencies in the administration of healthcare services that contribute to these extreme costs, a significant amount of the costs are associated with the administration and coordination of healthcare claims submitted to insurers and the subsequent response from insurers. In addition to being cost and resource intensive, the current healthcare transaction process lends itself to fraud and abuse. Because the current transaction process is complex, decentralized, and fragmented, it is difficult to detect and prevent fraud or abuse. This shortfall has created great additional costs to all.

As an example, the typical transaction process begins when a patient presents himself or herself to a healthcare provider. As part of the routine take-in procedure, the clinic or office collects information about the patient including the patient's name, address, contact information, and insurance information. This insurance information typically includes information about each of the insurance policies that provide coverage for the patient. This patient information is typically entered onto a Health Insurance Claim Form or decentralized data collection system. The patient is asked to sign a release, also presented on the Health Insurance Claim Form, granting the provider permission to release any medical or other information necessary to process the insurance claim.

The remainder of the form is typically completed by the provider or someone at the direction of the provider. This information often includes details regarding the diagnosis and services provided by the provider, including procedures and services rendered, supplies used, and the provider's usual and customary charges for the services and supplies. The provider also supplies their identification and other billing information required for the insurer to identify the provider and patient to the insurer.

The Health Insurance Claim Form is then forwarded to the insurer who initiates the adjudication and payment transaction process. Once received by the insurer, the form may change hands multiple times before the claim is ever adjudicated. The adjudication of the claim requires a claim specialist with knowledge of the covered patient's insurance policy to evaluate the diagnosis and treatment to determine if the healthcare services are covered by the patient's insurance policy. In some cases more information may be required by the insurer to make this determination, which the insurer may later request the healthcare provider to provide. If all or any part of the services provided are deemed to be covered, the insurer will provide payment.

The previously described process describes the simplest claim submission, adjudication and payment process. Even this simple payment transaction process takes a substantial amount of time and resources to complete. The process is even more complicated when there are multiple insurers or disputes regarding coverage. In the case of multiple insurers, an order of insurance must first be determined. One insurer is designated the primary insurer, the next insurer is designated secondary, and the next tertiary. This continues until there are no more associations in accordance with the industry rules. This order of insurance determination and subsequent coordination of benefits can make the payment transaction process take even longer.

This process of exchanging forms makes it difficult for parties to the payment transaction to valuate their respective accounts payable and accounts receivable at a given time. Providers are required to spend more time and resources to facilitate collections and insurers often lack the ability to aggregate liability data to detect fraud and other abusive behavior. The lack of transparency in the transaction process and the inability to compare performance and cost data undercuts the accountability of the parties and hinders the ability of the healthcare system to function efficiently.

Accordingly it would be desirable to have a payment transaction system that provides greater transparency for the parties involved, that provides a real time snapshot of services provided, liabilities incurred, and payments that are owed, and that reduces the administrative overhead as well as the time it takes to complete the payment transaction process.

BRIEF SUMMARY OF THE PRESENT INVENTION

The present invention comprises a healthcare payment transaction system for managing and arranging payment for a healthcare service transaction provided by a healthcare service provider to a patient, particularly where the payment is to be paid by an insurer. The system includes an electronic deposit account for the healthcare service provider. The healthcare service provider deposits information regarding healthcare service transactions performed by the healthcare service provider for patients in the deposit account. It also features an electronic deposit account for the insurer whereby the insurer may sweep all deposited healthcare transactions for information regarding healthcare service transactions for services provided for patients for which the insurer has payment responsibility. The insurer can also use its electronic deposit account to deposit payments for healthcare service transactions performed for patients covered by a policy issued by the insurer.

In the preferred embodiment a central system is used as a means for electronically transferring payments from the insurer's electronic deposit account to the healthcare service provider's electronic deposit account. A graphical user interface is provided as part of the central system to enable the healthcare service provider and insurer to view their respective deposit accounts. A sweep function is further provided as a means for determining whether the healthcare service provider has recorded information regarding a healthcare service transaction for a patient for whom the insurer has payment responsibility.

Figure 1:
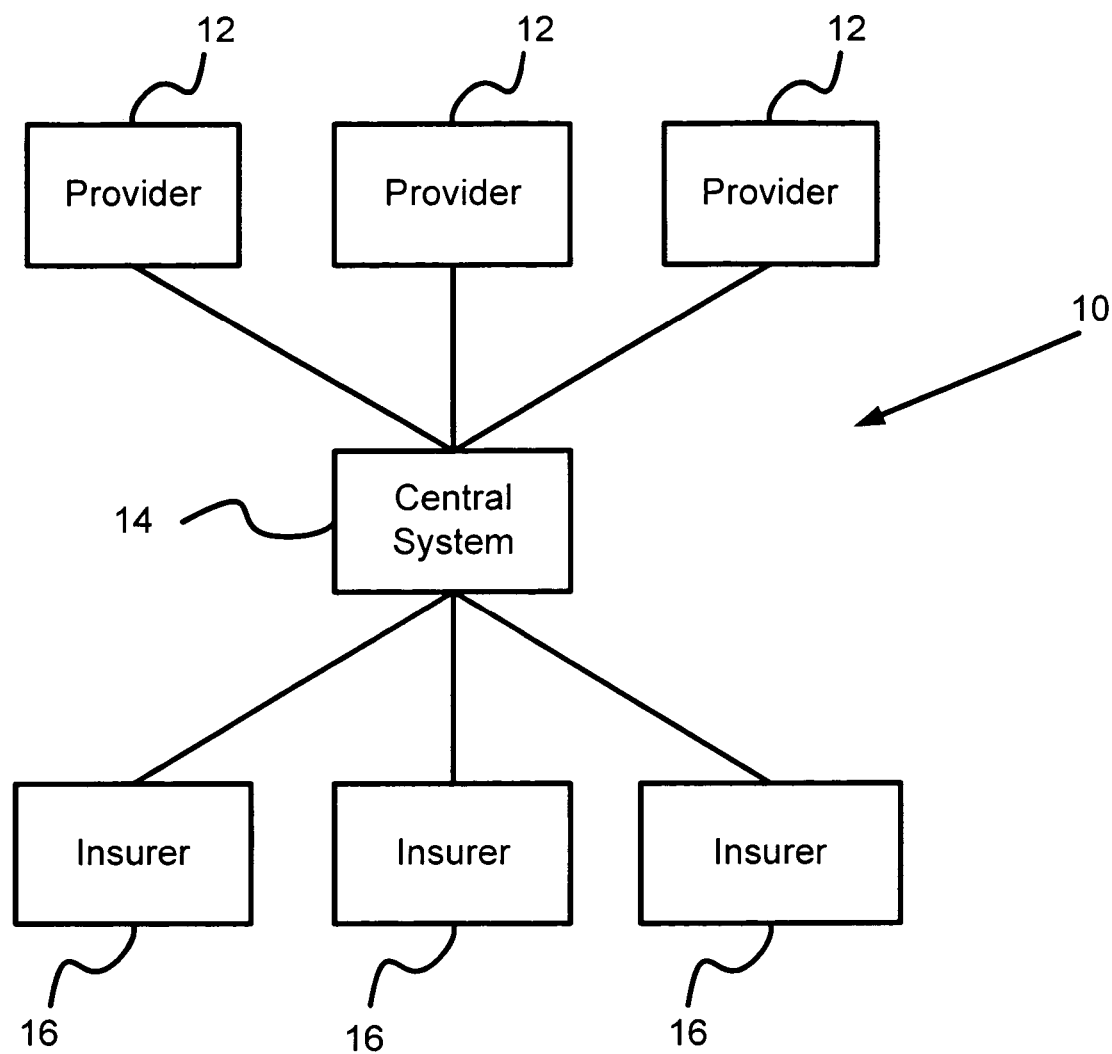
FIG. 1 is a schematic showing a payment transaction system.

REFERENCE NUMERALS IN THE DRAWINGS 10 payment transaction system 12 healthcare service provider
14 central system 16 insurer
18 deposit 20 information requests
22 billing errors 24 disputes
26 withdrawals 28 eligibility sweep
30 order of insurance determination 32 coordination of benefits
34 adjudication 36 asset management
38 provider credential 40 deposit
42 validation 44 secondary insurer
46 claim 48 audit trail
50 payers 52 associated payers

DETAILED DESCRIPTION OF THE INVENTION

A simplified and generalized representation of the present invention, payment transaction system 10, is provided in FIG. 1. Payment transaction system 10 is generally a subscription-based system for linking accounts and carrying out inter-account transactions between various healthcare service providers and payers, such as insurers. FIG. 1, central system 14 contains accounts for several healthcare service providers 12 and several insurers 16. The reader will appreciate that this is a drastically scaled-down representation of the present invention, as the preferred embodiment of central system 14 contains thousands of accounts for healthcare service providers and payers. Indeed, the preferred embodiment of the present invention is a universal system which is subscribed to by most healthcare service providers in the United States and most payers that provide service coverage for healthcare services provided by the healthcare service providers.

Figure 2:
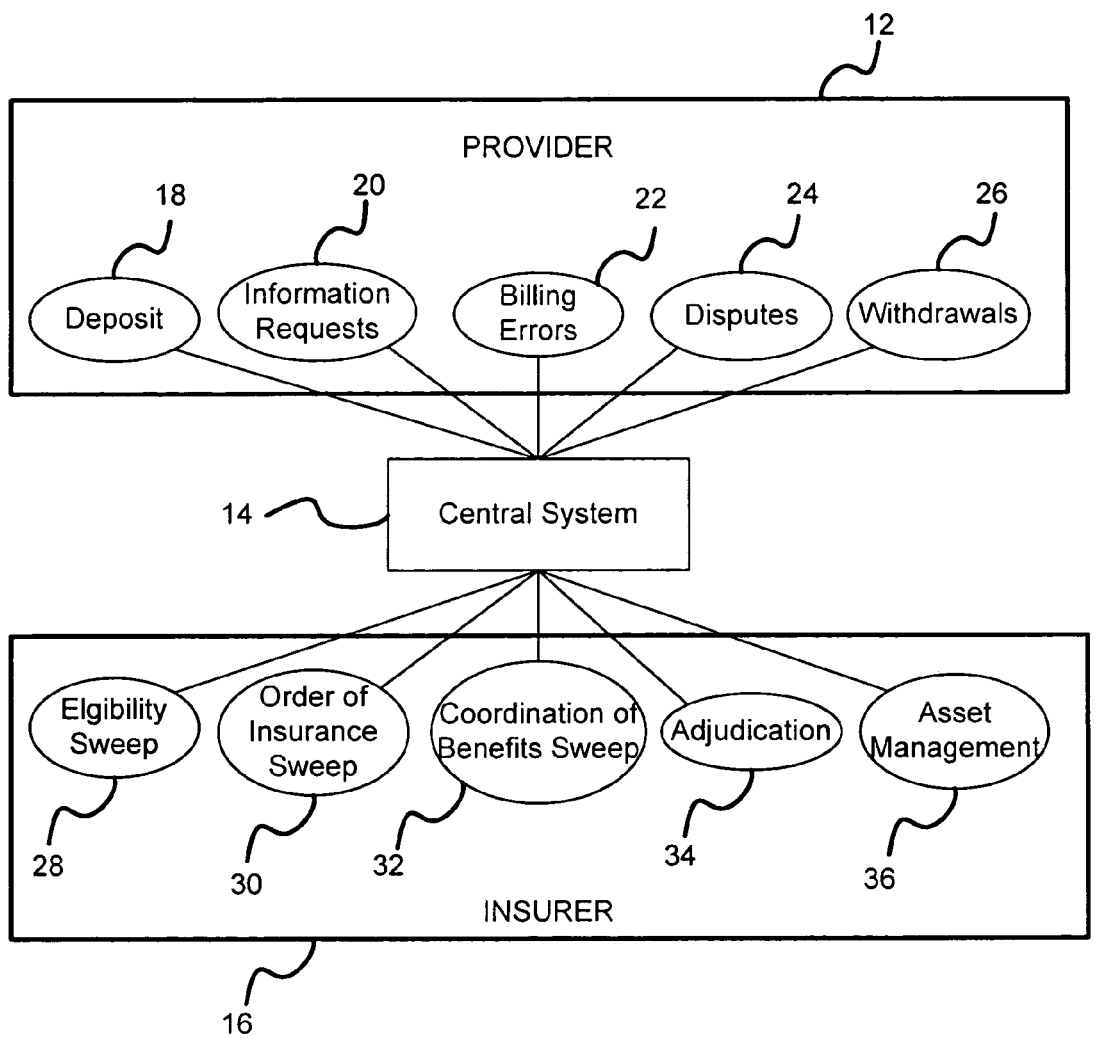
FIG. 2 is a schematic showing a payment transaction system.

A more detailed illustration of some of the salient features of the various types of deposit accounts contained within central system 14 is provided in FIG. 2. Specifically, deposit accounts are considered for healthcare service provider 12 and insurer 16. Among the many features provided, the account for healthcare service provider 12 includes a tool for making deposit 18. Deposit 18 describes a healthcare services transaction performed for a patient which may be covered by a payer-subscriber to payment transaction system 10. The reader will appreciate that deposit 18 is not an actual deposit of money, but it is a submission of information regarding the healthcare services provided. It is contemplated that the healthcare service provider will make deposit 18 into the deposit account after performing a healthcare service transaction. The information provided by the healthcare service provider in deposit 18 typically includes information normally provided in a Health Insurance Claim Form such as patient identifying information, diagnosis and treatment information for the healthcare service transaction, and billing information for the healthcare service transaction. Patient identifying information may include the patient's name, birth date, Social Security Number, and insurance policy numbers. Diagnosis and treatment information may include a general description of the services and products provided, diagnosis and/or treatment codes which correspond to known services. Billing information may include the healthcare service provider's usual and customary charge for the services provided and other information that may be necessary to receive payment from the insurer or other payer.

A tool for conducting information requests 20 is also provided as a part of the account for healthcare service provider 12. Information requests 20 allow the healthcare service provider to gain information regarding the status of deposits 18. The healthcare service provider can use the tool for many purposes including investigating the status of a specific deposit, or determining the total amount of deposits which have been paid or are outstanding. It is further contemplated that the healthcare service provider can use the tool for conducting information requests 20 to respond to specific inquiries made by payers regarding healthcare service transactions or billing details related to the healthcare service transactions performed by the healthcare service provider.

A tool for inputting billing errors 22 is also provided. This tool enables the healthcare service provider to correct mistakes made in the information provided as part of deposits 18. This feature dramatically reduces the time it takes to correct billing mistakes such as double charges and missed charges. This corrective mechanism allows for real time communication of billing errors 20 to the payer so that the mistake can be resolved as quickly as possible. When deposit 18 is associated with a specific payer, the details of deposit 18 are commonly shared with the healthcare service provider and payer. In the preferred embodiment deposit 18 exists as a discrete entity in the account of healthcare service provider 12 until eligibility sweep 28 is performed by the account of insurer 16 as will be explained subsequently. Once eligibility sweep 28 detects and associates deposit 18 with the account of insurer 16, deposit 18 is contemporaneously and jointly held within both parties accounts.

A communication means for resolving disputes 24 is also provided as part of the account of healthcare service provider 12. This allows the healthcare service provider and payer to communicate directly regarding any issues relating to payment for deposit 18. Disputes 24 can involve disputes over coverage and disputes over charges. Any other issues relating to payment of a claim can similarly be addressed through this communication means. As these disputes typically relate to a specific healthcare service transaction, the communication means can be linked to deposit 18. For example, the deposit accounts for healthcare service provider 12 and insurer 16 typically will contain many different deposits involving different healthcare service transactions for different patients and different parties to the payment transaction. By connecting the communication means with the deposit, the parties will be able to communicate about the specifics of the dispute with greater precision and clarity. For example, insurer 16 can highlight a specific line item of the claim and describe in textual form why they will not pay the claim as currently billed.

A means for obtaining withdrawals 26 is also provided as part of the account. Central system 14 includes a means for electronically transferring payment from the account of insurer 16 to the account of healthcare service provider 12. There are many ways that this transaction can be carried out. One example is using a simple wire transfer. Another example involves passing specific payment information such as banking and routing numbers together with payment amount and electronic authorization. This information is transmitted to the account of healthcare service provider 12, which can be connected to the healthcare service providers checking or savings account. The actual transfer of money then occurs bank to bank as opposed to an actual wire transfer through central system 14. Other means for obtaining withdrawals 26 can also be used including both transactions which occur outside and within central system 14.

The deposit account of insurer 16 optionally contains many other features. A computer software tool for conducting an eligibility sweep 28 is provided in the preferred embodiment. This tool sorts through all deposits made by all healthcare service providers who subscribe to payment transaction system 10 to determine if any healthcare service transactions relate to patients covered by insurance policies issued by insurer 16. Another tool can be provided for converting an insurer's database of customers into the query items which will be carried out in eligibility sweep 28. For example, a tool can be provided to upload identifying information for all policies and customers for which insurance policies have been issued by insurer 16 into the deposit account. The tool for conducting eligibility sweep 28 can then use this identifying information to associate service transactions and claims which should be further considered by insurer 16. For example, eligibility sweep 28 may sort all deposits for dates and policy numbers which relate to policies issued by insurer 16. Eligibility sweep 28 can be set to occur periodically as defined by central system 14 or insurer 16.

Another function can be provided for carrying out order of insurance determination 30. This function retrieves the deposit associations established during eligibility sweep 28 for the various insurers. If deposit 18 is associated with multiple insurers, the tool for carrying out order of insurance determination 30 recognizes deposit 18 as a deposit for which order of insurance determination 30 is needed. Order of insurance determination 30 is then carried out for deposit 18 using the applicable business and regulatory requirements. Those that are skilled in the art know that these determinations are customarily made by the mechanical application of rules. Accordingly, the algorithms for making this determination can be integrated into the function fairly easily.

Coordination of benefits 32 is another function of the deposit account of insurer 16 and is related to the function for carrying out order of insurance determination 30. Once order of insurance determination 30 is made, coordination of benefits 32 is carried out to determine which aspects of a particular service transaction claim may be covered by insurer 16.

The account of insurer 16 also includes a mechanism for adjudication 34 through which insurer 16 can make an actual determination of the extent of coverage of a patient's insurance policy and the appropriate payment of the claim. This process will be described in more detail subsequently. This mechanism also allows insurer 16 to carry out the electronic transfer payment as described previously in relation to withdrawals 26 made from the deposit account of healthcare service provider 12.

Asset management 36 is another functionality of the deposit account of insurer 16. This function enables insurer 16 to see the status of all outstanding and paid claims. Accordingly, insurer 16 can see a real-time view of the insurer's liabilities as the liabilities are incurred. Asset management 36 also can be used to detect and prevent fraud. Asset management 36 enables the aggregation of claim data as claims are filed, and a history of paid claims also can be maintained. Various fraud detection schemes and algorithms can then be employed to find abusive practices as many abusive practices show up as patterns in the aggregated data.

Figure 3:
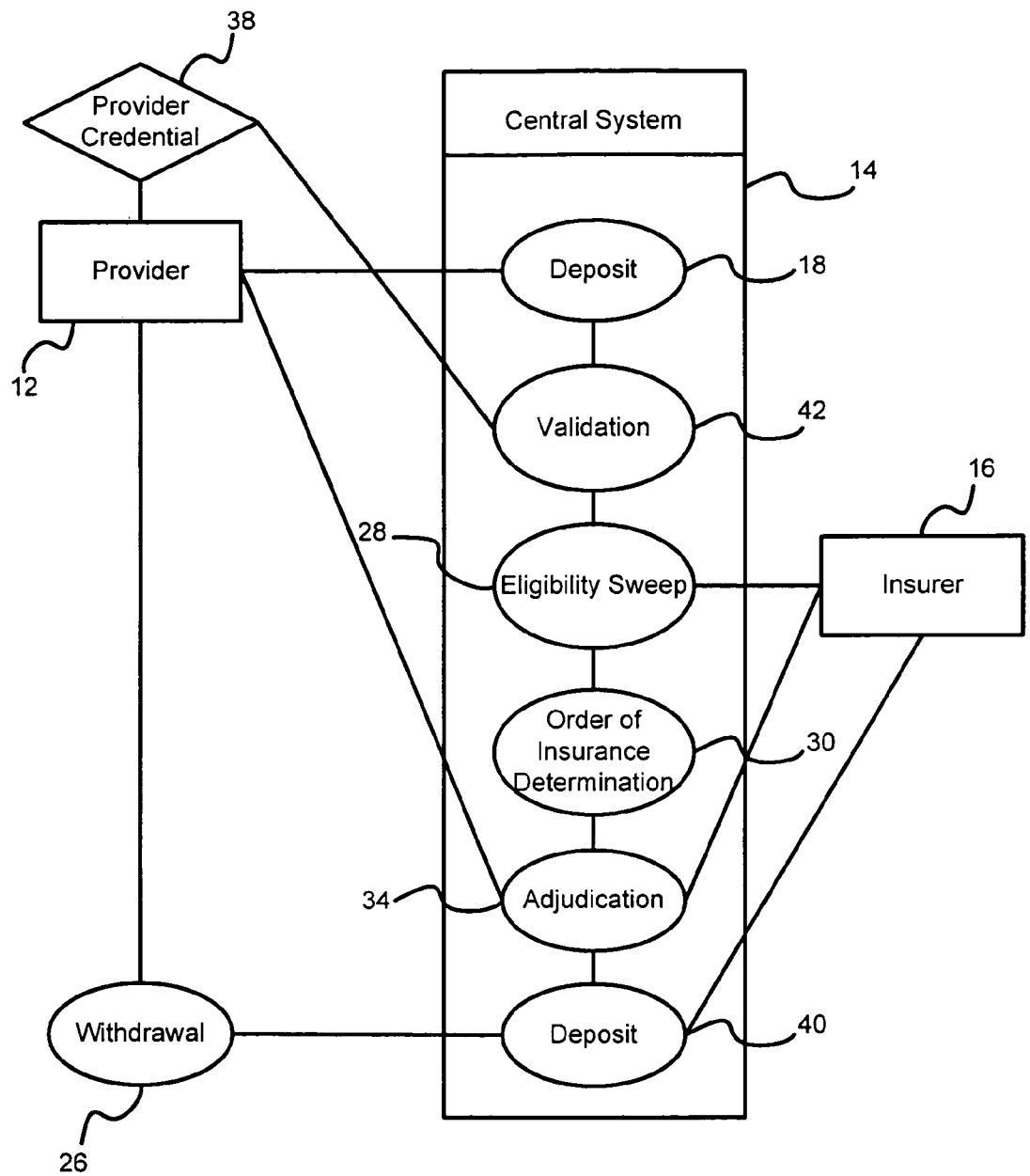
FIG. 3 is a schematic showing a payment transaction system.
Figure 4:
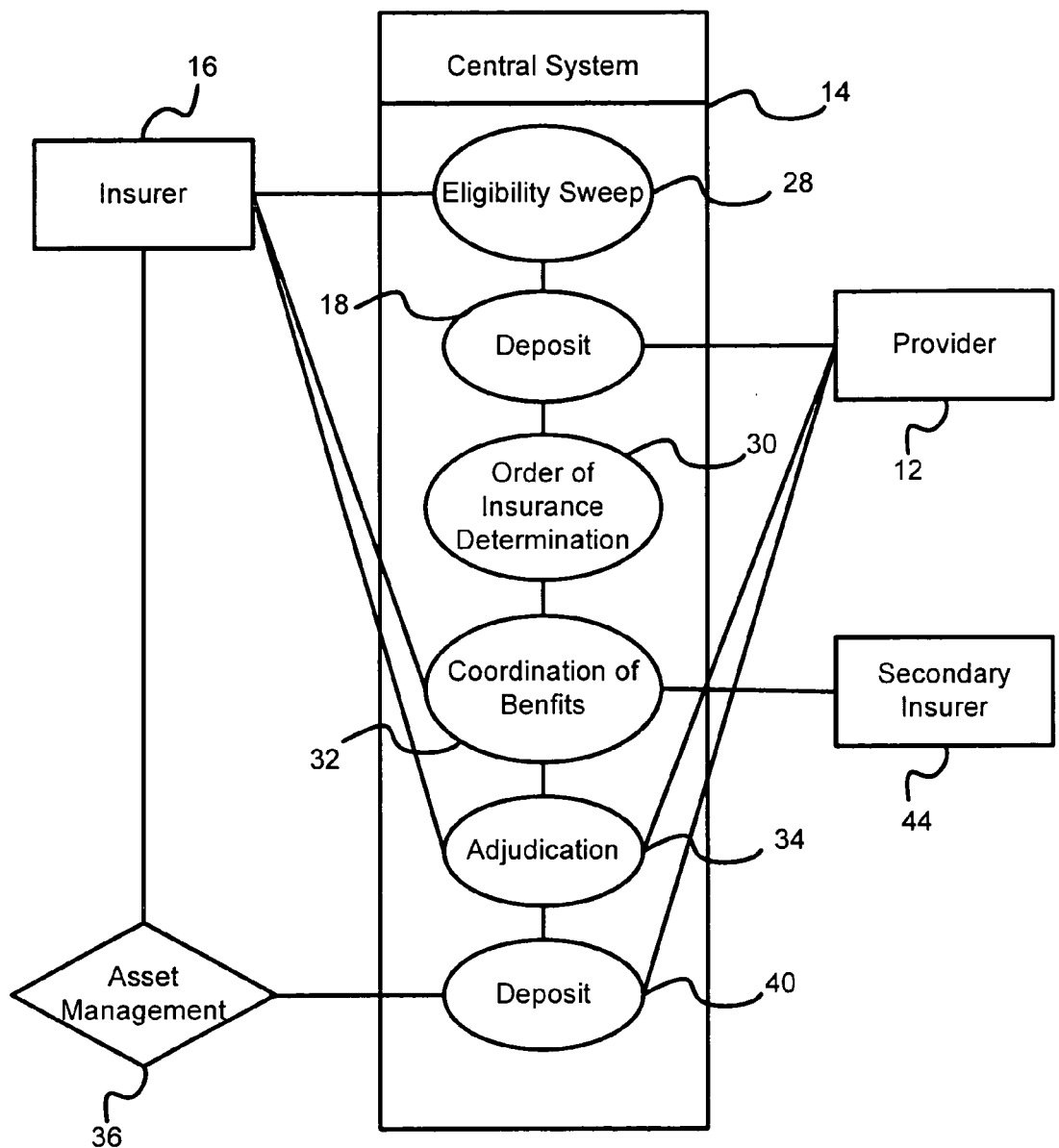
FIG. 4 is a schematic showing a payment transaction system.

A more detailed illustration of the payment transaction method using payment transaction system 10 is provided in FIGS. 3 and 4. FIG. 3 illustrates the transaction from the perspective of healthcare service provider 12. The process begins when healthcare service provider 12 makes deposit 18 into the provider's account in central system 14. Central system 14 performs validation 42 by checking provider credential 38. Provider credential 38 can be a number, password, hardware key, computer program or other any other means of authorization that uniquely identifies healthcare service provider 12 and associates healthcare service provider 12 with the deposit account. Provider credential 38 also serves to authenticate the healthcare service provider to the payers so that the payers may "recognize" the healthcare service provider as an authorized provider of services "covered" by the payer. The reader will appreciate that provider credential 38 significantly reduces administrative costs because the payer will no longer need to perform a credential check for each claim that is filed. Instead provider credential 38 serves as a quick, secure, and reliable method of identification. If deposit 18 meets the requirements of validation 42, deposit 18 will be accepted by the deposit account of healthcare service provider 12.

Deposit 18 remains in the deposit account until eligibility sweep 28 is ordered by insurer 16 or otherwise performed by central system 14. Although eligibility sweep 28 is the preferred method of identifying and associating deposits with the appropriate insurers, a preliminary eligibility determination function can also be integrated into central system 14 that automatically associates deposit 18 with the appropriate payer deposit accounts immediately when deposit 18 is made. Other means for determining whether healthcare service provider 12 has recorded information regarding a healthcare service transaction for a patient for which said payer 16 has payment responsibility can also be used. Eligibility sweep 28 is meant merely to describe one example of making an eligibility determination.

As described previously, order of insurance determination 30 applies the appropriate business and regulatory requirements to deposits which are associated with multiple insurers. As with the previously described tools and functionalities, order of insurance determination 30 is also carried out by computer software running on a computer. Insurer 16 then adjudicates the claim via adjudication 34, involving healthcare service provider 12 as needed. Provider 12 may need to provide further information regarding a particular service transaction or insurer may dispute the coverage or amount of payment associated with the claim. If insurer 16 determines that any portion of deposit 18 relates to services provided for which insurer 16 has payment responsibility, insurer 16 makes deposit 40 into their deposit account in central system. As mentioned previously, deposit 40 is then electronically transferred to the deposit account of healthcare service provider 12. Healthcare service provider 12 makes withdrawal 26 to the provider's checking or savings account.

FIG. 4 illustrates the transaction from the perspective of insurer 16. Insurer 16 orders eligibility sweep 28 via their deposit account or eligibility sweep 28 is automatically initiated by central system 14. Eligibility sweep 28 detects deposit 18 along with any other deposits which are associated with policies issued by insurer 16. As described previously, if deposit 18 is associated with multiple insurers, order of insurance determination 30 is carried out. For example, deposit 18 may indicate association with insurer 16 and secondary insurer 44. In this case, central system 14 determines the appropriate order of insurance and coordination of benefits 32 occurs between insurer 16 and secondary insurer 44 with respect to deposit 18. Insurer 16 and secondary insurer 44 independently adjudicate their respective portions of the claim described by deposit 18 via adjudication 34. Deposit 40 is then provided for any portion of the claim that is determined to be covered by the policy issued by insurer 16 and/or secondary insurer 44. A tool for asset management 36 allows insurer 16 to track deposit 40 along with other deposits made over a defined period. As discussed previously, this tool can be used to aggregate claim information for both paid and unpaid claims.

In the preferred embodiment, central system 14 provides insurer 16 and healthcare service provider 12 with the same record of the payment transaction. A graphical user interface can be provided so that insurer 16 and provider 12 may access their deposit accounts and view information regarding said healthcare service transaction and corresponding payment transaction. Access can be provided via the public internet or through any other connection means. Various security devices can be employed to prevent disclosure of this information to unauthorized parties. This one-view-for-all approach enables insurer 16 and healthcare service provider 12 to deal face-to-face in a virtual sense. Each party has access to the same details regarding the payment transaction making the transaction process as transparent as possible. There are many benefits to using the aforementioned transparent process. These benefits include improved transactional efficiency and reduced fraud.

The reader will appreciate that this process is easily scalable to incorporate any number of subscribing healthcare service providers and payers. Furthermore, the aforementioned transaction process creates a money trail which increases transparency and reduces the opportunity for fraud. The transaction process can allow for multi-currency transactions globalizes competition which promotes competition and efficiency. Other advantages and opportunities maybe realized by the use of the proposed payment transaction system and method and they all are within the scope of the invention claimed herein.

Figure 5:
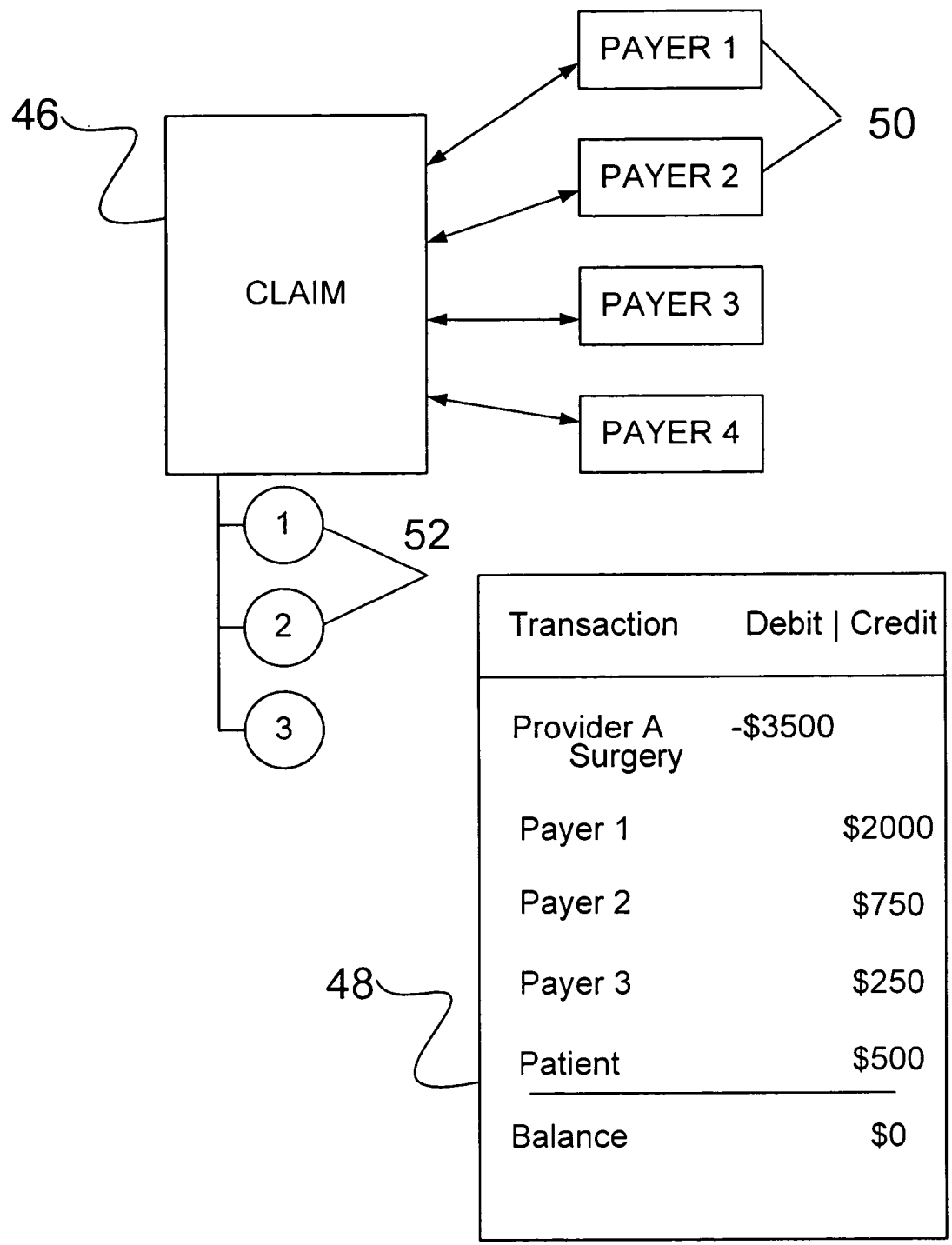
FIG. 5 is a schematic showing a payment transaction system.

FIG. 5 illustrates the proposed transaction system and method from the perspective of a claim processed using the proposed system and method. Claim 46 represents a discrete healthcare transaction which has been "deposited" into the system by Provider A, a healthcare service provider who performed a surgery on a patient. From this perspective, the reader will appreciate that claim 46 is centrally persistent—it stays in one location. This may be contrasted with prior art transaction systems where a claim passes between various payers and providers until the claim is fully adjudicated by all interested parties. Payers 50 "see" claim 46 when performing their respective eligibility sweeps of the central system. The eligibility sweep is performed to determine if any claims exist for which payers 50 may have payment responsibility.

The software which performs the "sweep" function may automatically associate a payer with payment responsibility for a claim with the claim or the software may require that the payer review claims with potential payment responsibility and then formally "elect" or "subscribe" to the claim. Whatever mechanism is used, payers with payment responsibility for a claim are associated to the claim as associated payers 52. In the example, three payers are associated with the claim. This feature facilitates superior indexing of claim 46 and enables all parties having an interest in claim 46 to easily access claim 46 without having to perform another eligibility sweep.

Claim 46 is also associated with audit trail 48. Audit trail 48 may be viewed by the payers, the providers, and other parties who are otherwise "permissioned" to view the payment transaction history of claim 46. In the present example, the reader will note that audit trail 48 shows that Provider A performed a surgery for which Provider A charged $3,500. Because several associated payers 52 have potential payment responsibility for claim 46, an order of insurance determination was made. In the present example, Payer 1 had primary payment responsibility for claim 46. Payer 1 adjudicated the claim and "credited" $2,000 towards claim 46. Payer 2 followed suit and credited $750. Payer 3 then credited $250 toward the claim 46, leaving a balance of $500 which was owed by the patient. In the present example, the patient paid the balance, so audit trail 48 reflects a current balance of $0. Accordingly, claim 46 was paid in full.

When a claim is paid in full, such as shown in the present example, the claim may be archived or indexed as a "completed transaction." This feature prevents the unnecessary accumulation of paid claims in the provider's deposit account or payer's deposit account. Instead, the provider or payer may choose to reference or view paid claims only as needed.

Although the preceding descriptions contain significant detail they should not be viewed as limiting the invention but rather as providing examples of the preferred embodiments of the invention. For example, the deposit accounts for healthcare service provider 12 and insurer 16 may include any number of the features described herein. Furthermore, it should be understood that the deposit accounts and tools may exist outside of central system 14. For example, each of the deposit accounts can exist on independent servers and linked by remote communication means. In addition, various types of network communications can be used for providing access to the electronic deposit accounts. Such variations do not depart from the spirit and scope of the present invention. Accordingly, the scope of the invention should be determined by the following claims, rather than the examples given.

We claim:

1. A healthcare transaction system for managing and arranging payment for a healthcare service provided to a patient by a healthcare service provider, said payment being owed by one or more payers, comprising:

a. a central data system residing on a computer which is independent from said healthcare service provider and said payers, said central data system including authenticated access control for said healthcare service provider and said payers, wherein all information submitted remains centrally persistent in said central data system;

b. an electronic deposit account which is created by said healthcare service provider over the Internet, in said central data system, wherein said electronic deposit account includes information pertaining only to said individual healthcare service provided to said patient;

c. an electronic deposit account for each of said payers in said central system, into which each of said payers submits coverage information sufficient to determine whether said electronic deposit account created for said individual healthcare service is a healthcare service for which each of said payers owes a payment;

d. an sweep tool for performing a relationship sweep within said central system, wherein said relationship sweep creates a link between said electronic deposit account for said individual healthcare service and said electronic deposit account for each payer having an obligation to pay for at least part of said individual healthcare service;

e. wherein each link created by said sweep tool is limited to said deposit describing said individual healthcare service and one payer;

f. wherein a payer is provided access to said electronic deposit account for said individual healthcare service once a link is created;

g. wherein once a link is created both said healthcare service provider and a linked payer are able to submit information to said electronic deposit account for said individual healthcare service;

h. wherein once said link is created both said healthcare service provider and a linked payer are able to review all information submitted into said electronic deposit account for said individual healthcare services;

i. wherein once a payer is given access to said particular linked deposit said payer can deposit payment for said healthcare service transaction with said central data system;

j. a means for electronically transferring said payment from said payer to said healthcare service provider; and k. an asset management tool which allows each of said payers to determine its total liability within said central system following each sweep made.

2. The healthcare transaction system of claim 1, wherein said information regarding said individual healthcare service transaction includes a set of information which is commonly supplied in a prior art insurance claim form.

3. The healthcare transaction system of claim 1, wherein said information regarding said healthcare service transaction includes identifying information for said patient, diagnosis and treatment information for said healthcare service transaction, and billing information for said healthcare service transaction.

4. The healthcare transaction system of claim 1, further comprising a provider credential associated with said healthcare service provider configured to authenticate said healthcare service provider to said at least one payer so that said at least one payer may recognize said healthcare service provider as an authorized provider of services covered by said at least one payer.

5. The healthcare transaction system of claim 1, wherein once said sweep tool retrieves said individual deposit and associates said individual deposit with said at least one payer, said individual deposit is accessible to both said account of said healthcare service provider and said account for said at least one payer.

6. The healthcare transaction system of claim 1, wherein at least one payer can order said sweep using said sweep tool.

7. A method for arranging for payment for a healthcare service provided to a patient by a healthcare service provider, said payment being owed by one or more payers, comprising the steps of:

a. providing a central data system residing on a computer which is independent from said healthcare service provider and said payers, said central data system including authenticated access control for said healthcare service provider and said payers, wherein all information submitted remains centrally persistent in said central data system;

b. said healthcare service provider creating an electronic deposit account in said central data system over the Internet, wherein said electronic deposit account includes information pertaining only to said individual healthcare service provided to said patient;

c. each of said payers creating an electronic deposit account in said central data system into which each of said payers submits coverage information sufficient to determine whether said electronic deposit account created for said individual healthcare service is a healthcare service for which each of said payers owes a payment;

d. performing a relationship sweep within said central data system, wherein said relationship sweep creates a link between said electronic deposit account for said individual healthcare service and said electronic deposit account for each payer having an obligation to pay for at least part of said individual healthcare service;

e. wherein each link created by said relationship sweep is limited to said deposit describing said individual healthcare service and one payer;

f. providing a payer access to said electronic deposit account for said individual healthcare service once a link is created;

g. wherein once a link is created both said healthcare service provider and a linked payer are able to submit information to said electronic deposit account for said individual healthcare service;

h. wherein once a link is created both said healthcare service provider and a linked payer are able to review all information submitted into said electronic deposit account for said individual healthcare services;

i. wherein once a payer is given access to said particular linked deposit said payer can deposit payment for said healthcare service transaction with said central data system;

j. transferring said payment deposited by said payer to said healthcare service provider; and k. determining a total liability for a payer within said central data system following said sweep.

8. The method of claim 7, further comprising the step of adjudicating said information pertaining to said particular deposits to determine the existence and extent of actual payment responsibility belonging to a plurality of said payers.

9. The method of claim 8, further comprising the steps of:

a. determining order of insurance with respect to a plurality of payers having potential payment responsibility for said patient; and b. determining coordination of benefits with respect to said plurality of payers having potential payment responsibility for said patient.

10. The method of claim 8, further comprising the step of:

a. transferring payment for said healthcare service transaction from said electronic deposit account for said payer to said electronic deposit account for said healthcare service provider.

11. The method of claim 7, further comprising the step of determining order of insurance with respect to each of a plurality of payers having potential payment responsibility for said particular deposit.

12. The method of claim 7, further comprising the step of:

a. transferring payment for said healthcare service transaction from said electronic deposit account for said plurality of payers to said electronic deposit account for said healthcare service provider; and b. wherein said plurality of payers associated with said individual deposit have the ability to view the status of said payments made to said healthcare service provider.

* * * * *